(12) United States Patent
Hattori

(10) Patent No.: US 12,728,881 B2
(45) Date of Patent: Sep. 8, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Yoshiya Hattori, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 10 days.

(21) Appl. No.: 19/059,631

(22) Filed: Feb. 21, 2025

(65) Prior Publication Data

US 2025/0296592 A1 Sep. 25, 2025

(30) Foreign Application Priority Data

Mar. 25, 2024 (JP) ................................ 2024-047913

(51) Int. Cl.
*B60W 50/14* (2020.01)
*B60T 7/12* (2006.01)

(52) U.S. Cl.
CPC ............... *B60W 50/14* (2013.01); *B60T 7/12* (2013.01); *B60T 2210/20* (2013.01);
(Continued)

(58) Field of Classification Search
CPC ........... B60W 50/14; B60W 2050/143; B60W 2050/146; B60W 2520/105; B60T 7/12; B60T 2210/20
(Continued)

(56) References Cited

U.S. PATENT DOCUMENTS

2011/0102166 A1* 5/2011 Filev ..................... B60W 40/09 340/441
2013/0261951 A1 10/2013 Sekiguchi et al.
2017/0341612 A1* 11/2017 Ohmori ............... B60R 21/0134

FOREIGN PATENT DOCUMENTS

JP 2002-163785 6/2002
JP 2003-175810 6/2003
(Continued)

OTHER PUBLICATIONS

Japanese Office Action for Japanese Patent Application No. 2024-047913 mailed Aug. 26, 2025.

*Primary Examiner* — Kam Wan Ma
(74) *Attorney, Agent, or Firm* — Amin, Turocy & Watson, LLP

(57) ABSTRACT

A vehicle control device includes a first-acquisition-part that acquires first-information related to curved road existing in advancing direction of a vehicle, a second-acquisition-part that acquires second-information including acceleration-operation-amount of driver of the vehicle, and a controller that performs notification-control to notify the driver to adjust speed of the vehicle to be equal to or lower than a target speed, which is based on the first-information, and refers the second-information during execution of the notification-control and stops the notification-control when the acceleration-operation-amount is increased predetermined value or more from reference value, when the vehicle is traveling on section which is from predetermined distance before entrance of the curved road until the entrance of the curved road or traveling on the curved road, the reference value is set according to the acceleration-operation-amount when the notification-control was started until predetermined time elapses from the start of the notification-control.

6 Claims, 11 Drawing Sheets

(52) U.S. Cl.
CPC . *B60W 2050/143* (2013.01); *B60W 2050/146* (2013.01); *B60W 2520/105* (2013.01)

(58) Field of Classification Search
USPC .......................................................... 340/439
See application file for complete search history.

(56) References Cited

FOREIGN PATENT DOCUMENTS

| | | |
|---|---|---|
| JP | 2006-137235 | 6/2006 |
| JP | 2008-238986 | 10/2008 |
| JP | 5190022 | 4/2013 |
| JP | 2013-203339 | 10/2013 |

* cited by examiner

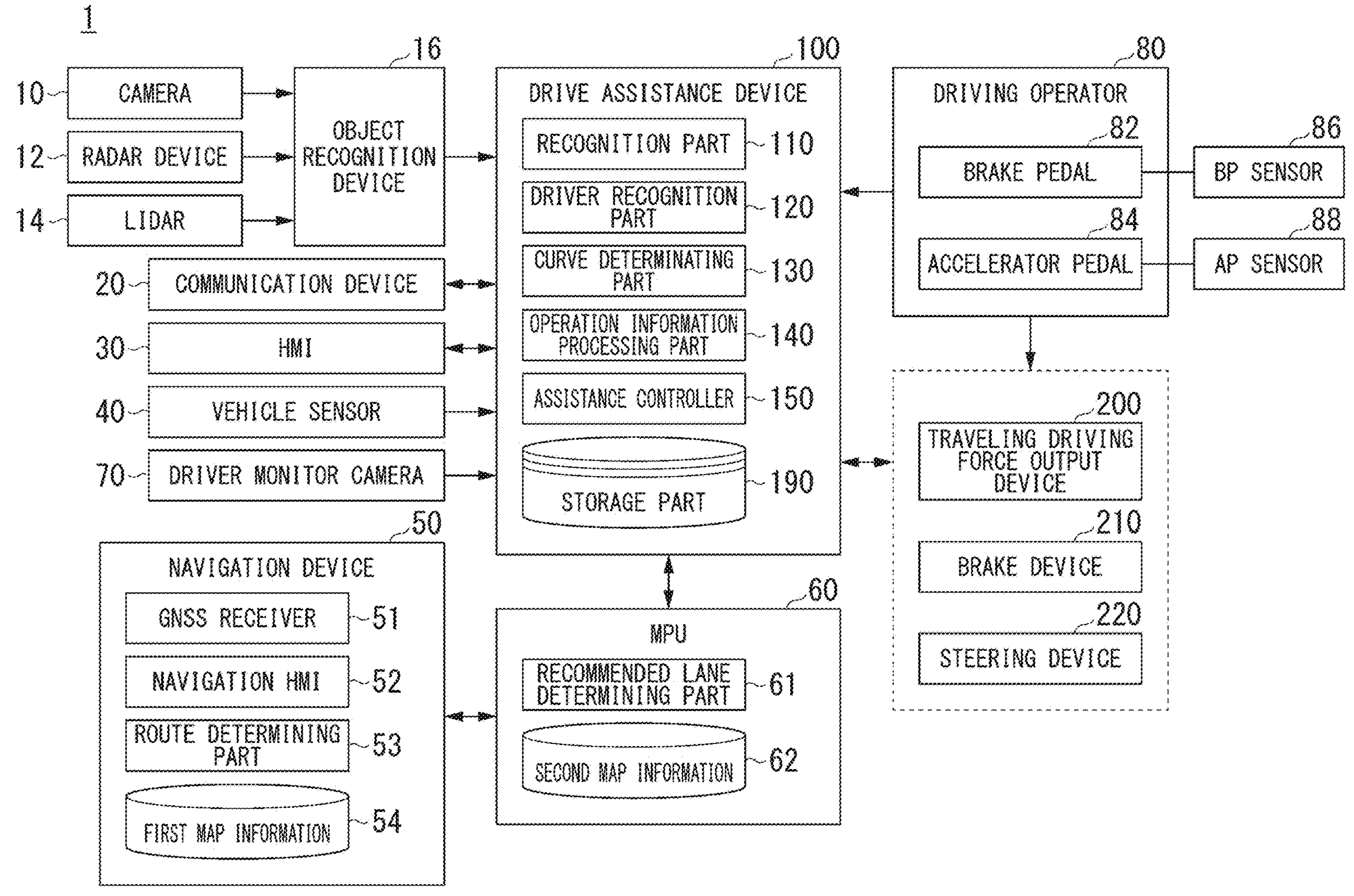
FIG. 1
1
CAMERA
10
RADAR DEVICE
12
LIDAR
14
OBJECT RECOGNITION DEVICE
16
COMMUNICATION DEVICE
20
HMI
30
VEHICLE SENSOR
40
DRIVER MONITOR CAMERA
70
NAVIGATION DEVICE
50
GNSS RECEIVER
51
NAVIGATION HMI
52
ROUTE DETERMINING PART
53
FIRST MAP INFORMATION
54
DRIVE ASSISTANCE DEVICE
100
RECOGNITION PART
110
DRIVER RECOGNITION PART
120
CURVE DETERMINATING PART
130
OPERATION INFORMATION PROCESSING PART
140
ASSISTANCE CONTROLLER
150
STORAGE PART
190
MPU
60
RECOMMENDED LANE DETERMINING PART
61
SECOND MAP INFORMATION
62
DRIVING OPERATOR
80
BRAKE PEDAL
82
ACCELERATOR PEDAL
84
BP SENSOR
86
AP SENSOR
88
TRAVELING DRIVING FORCE OUTPUT DEVICE
200
BRAKE DEVICE
210
STEERING DEVICE
220

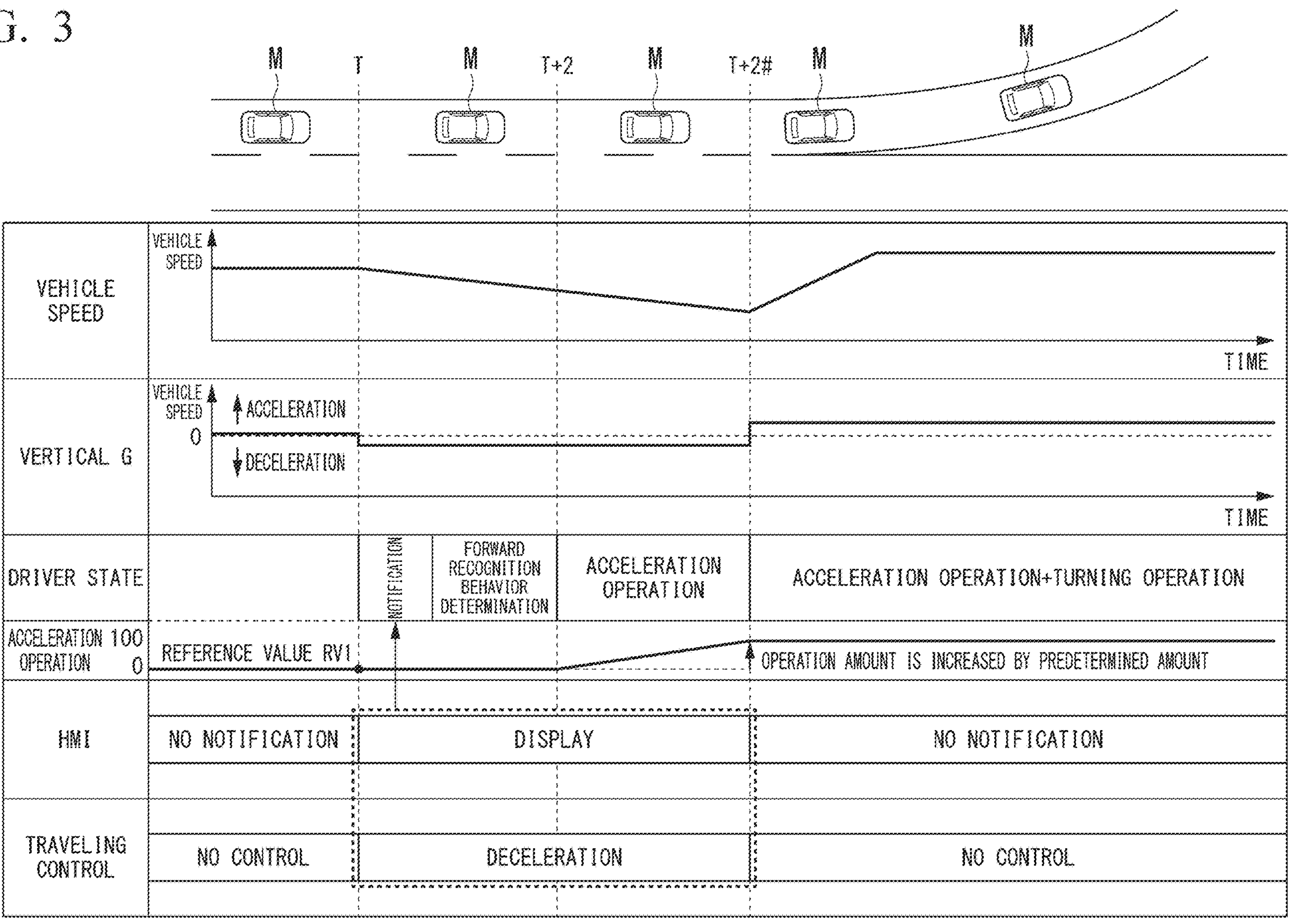
FIG. 3
M
T
M
T+2
M
T+2#
M
M
VEHICLE SPEED
VEHICLE SPEED
TIME
VERTICAL G
VEHICLE SPEED
0
ACCELERATION
DECELERATION
TIME
DRIVER STATE
NOTIFICATION
FORWARD RECOGNITION BEHAVIOR DETERMINATION
ACCELERATION OPERATION
ACCELERATION OPERATION+TURNING OPERATION
ACCELERATION OPERATION 100
0
REFERENCE VALUE RV1
OPERATION AMOUNT IS INCREASED BY PREDETERMINED AMOUNT
HMI
NO NOTIFICATION
DISPLAY
NO NOTIFICATION
TRAVELING CONTROL
NO CONTROL
DECELERATION
NO CONTROL

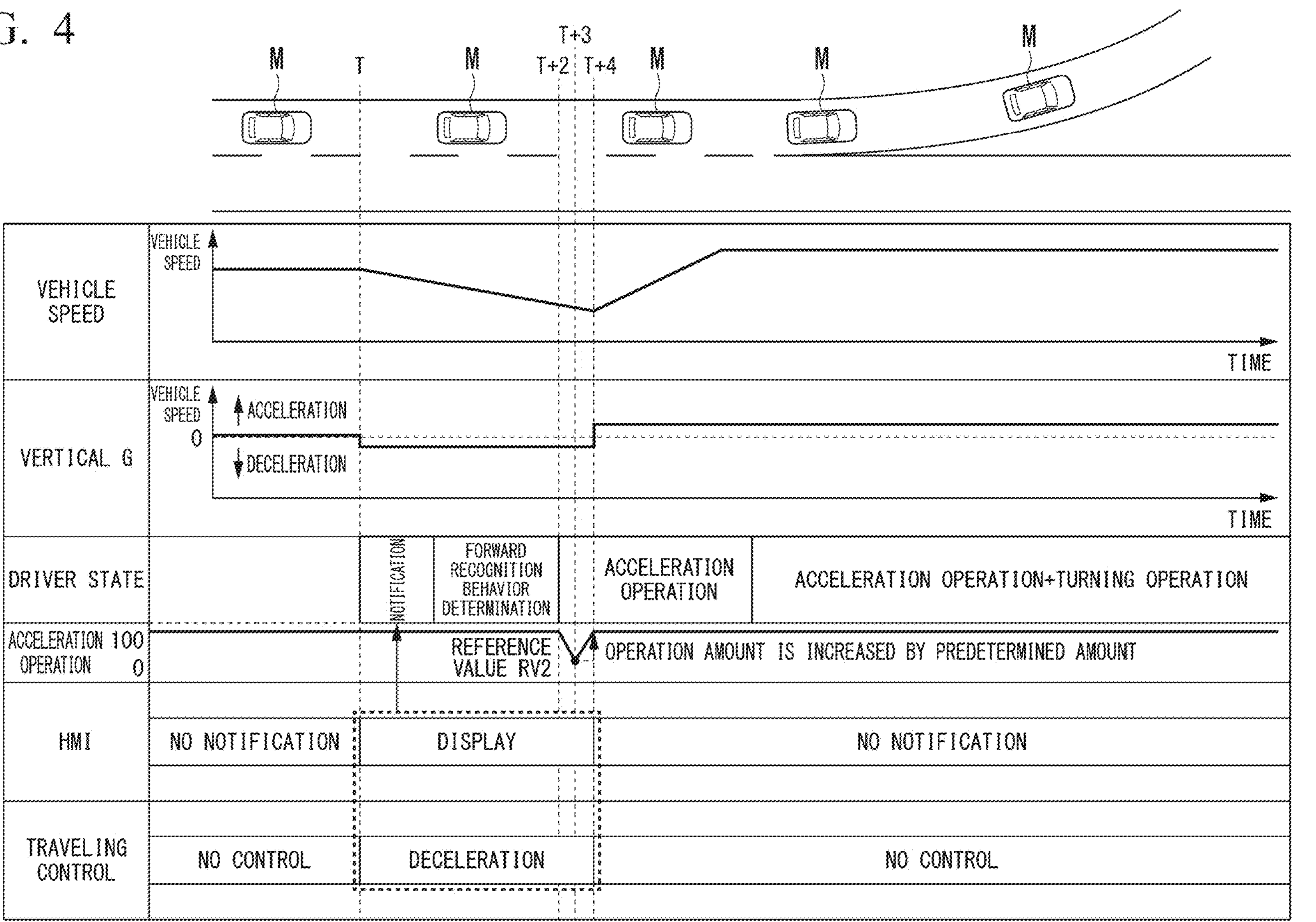
FIG. 4
M
T
M
T+3
T+2
T+4
M
M
M
VEHICLE SPEED
VEHICLE SPEED
TIME
VERTICAL G
VEHICLE SPEED
0
ACCELERATION
DECELERATION
TIME
DRIVER STATE
NOTIFICATION
FORWARD RECOGNITION BEHAVIOR DETERMINATION
ACCELERATION OPERATION
ACCELERATION OPERATION+TURNING OPERATION
ACCELERATION OPERATION
100
0
REFERENCE VALUE RV2
OPERATION AMOUNT IS INCREASED BY PREDETERMINED AMOUNT
HMI
NO NOTIFICATION
DISPLAY
NO NOTIFICATION
TRAVELING CONTROL
NO CONTROL
DECELERATION
NO CONTROL

Figure 8:
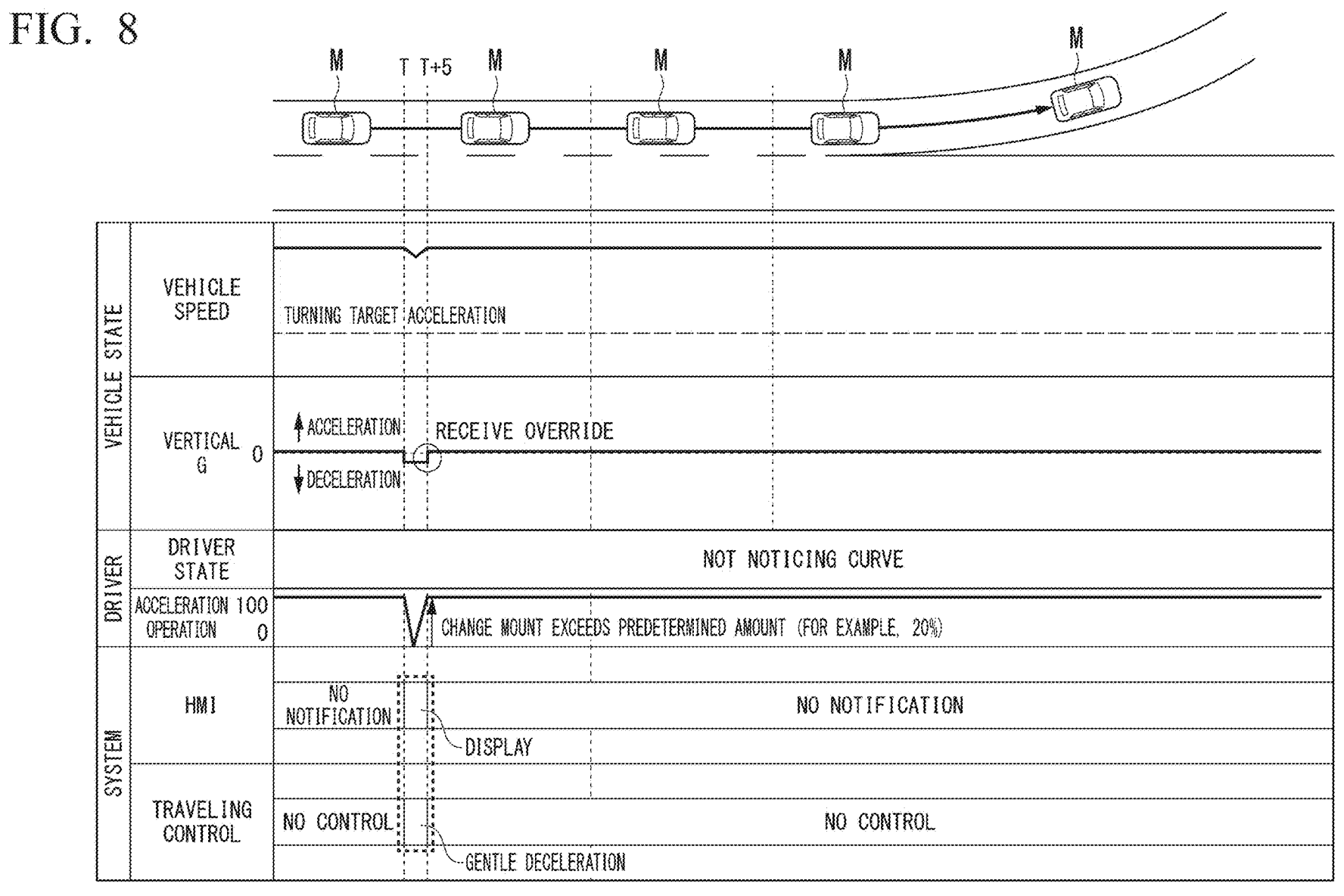

VEHICLE STATE
VEHICLE SPEED
TURNING TARGET ACCELERATION
VERTICAL G
0
ACCELERATION
DECELERATION
RECEIVE OVERRIDE

DRIVER
DRIVER STATE
NOT NOTICING CURVE
ACCELERATION OPERATION
100
0
CHANGE MOUNT EXCEEDS PREDETERMINED AMOUNT (FOR EXAMPLE, 20%)

SYSTEM
HMI
NO NOTIFICATION
DISPLAY
NO NOTIFICATION
TRAVELING CONTROL
NO CONTROL
GENTLE DECELERATION
NO CONTROL

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2024-047913, filed Mar. 25, 2024, the content of which is incorporated herein by reference.

BACKGROUND OF THE INVENTION

Field of the Invention

The present invention relates to a vehicle control device, a vehicle control method, and a storage medium.

Description of Related Art

In recent years, there have been increasing attempts to provide sustainable transportation systems that take into account various situations. To achieve this, research and development into driver assistance technology to further improve traffic safety and convenience has been focused upon. For example, an automatic brake device has been disclosed that applies a braking force to a vehicle before entering a curve until the vehicle reaches a safe speed at which it can safely enter the curve (for example, see Japanese Patent No. 5190022). The automatic brake device determines whether the distance to an entrance to the curve is equal to or greater than a predetermined distance, and when it is determined that it is equal to or greater than the predetermined distance, it is determined whether the driver has an acceleration intention and the braking force is reduced depending on presence or absence of an acceleration intention.

SUMMARY OF THE INVENTION

In the device in the related art, it was sometimes impossible to achieve vehicle control according to the driver's intention. For example, there were times when the vehicle could not be made to accelerate according to the driver's intention. For example, there was a case in which a control state of the vehicle is changed in a way not intended by the driver.

An aspect of the present invention is directed to providing a vehicle control device, a vehicle control method, and a storage medium that are capable of realizing control of a vehicle according to a driver's intention. For example, an aspect of the present invention is directed to causing a vehicle to accelerate in response to a driver's intention. Further, an aspect of the present invention is directed to contributing to development of a sustainable transportation system, taking into consideration occupants.

A vehicle control device, a vehicle control method, and a storage medium according to the present invention employ the following configurations.

(1) A vehicle control device according to an aspect of the present invention is a vehicle control device including: a first acquisition part configured to acquire first information related to a curved road existing in a direction of advance of a vehicle; a second acquisition part configured to acquire second information including an acceleration operation amount of a driver of the vehicle; and a controller configured to perform notification control to notify the driver to adjust a speed of the vehicle to be equal to or lower than a target speed, which is based on the first information, and configured to refer the second information during execution of the notification control and to stop the notification control when the acceleration operation amount is increased a predetermined value or more from a reference value, when the vehicle is traveling on a section which is from a predetermined distance before an entrance of the curved road until the entrance of the curved road or traveling on the curved road, wherein the reference value is set according to the acceleration operation amount when the notification control was started until a predetermined time elapses from the start of the notification control.

(2) In the aspect of the above-mentioned (1), the controller is configured to change the notification control to second notification by sound from first notification by display, and the predetermined time is a time period until the notification control is changed to the second notification from the first notification.

(3) In the aspect of the above-mentioned (1) or (2), the controller is configured to set the reference value to a minimum value of the acceleration operation amount during execution of the notification control after the predetermined time has elapsed.

(4) In the aspect of the above-mentioned (1), the controller is configured to perform deceleration control to decelerate the vehicle so that the speed of the vehicle approaches a target speed based on the first information, when the vehicle is traveling on the section which is from the predetermined distance before the entrance of the curved road until the entrance of the curved road or traveling on the curved road.

(5) A vehicle control method according to another aspect of the present invention is a vehicle control method of causing a computer to: acquire first information related to a curved road existing in a direction of advance of a vehicle; acquire second information including an acceleration operation amount of a driver of the vehicle; and perform notification control to notify the driver to adjust a speed of the vehicle to be equal to or lower than a target speed, which is based on the first information, refer the second information during execution of the notification control and stop the notification control when the acceleration operation amount is increased a predetermined value or more from a reference value, when the vehicle is traveling on a section which is from a predetermined distance before an entrance of the curved road until the entrance of the curved road or traveling on the curved road, wherein the reference value is set according to the acceleration operation amount when the notification control was started until a predetermined time elapses from the start of the notification control.

(6) A storage medium according to another aspect of the present invention is a computer-readable non-transitory storage medium in which a program is stored to cause a computer to: acquire first information related to a curved road existing in a direction of advance of a vehicle; acquire second information including an acceleration operation amount of a driver of the vehicle; perform notification control to notify the driver to adjust a speed of the vehicle to be equal to or lower than a target speed, which is based on the first information; and refer the second information during execution of the notification control and stop the notification control when the acceleration operation amount has increased a predetermined value or more from a reference value, when the vehicle is traveling on a section which is from a predetermined distance before an entrance of the curved road until the entrance of the curved road or traveling on the curved road, wherein the reference value is set according to the acceleration operation amount when the notification control was started until a predetermined time elapses from the start of the notification control.

According to the aspects of (1) to (6), it is possible to realize the vehicle control according to the driver's intention. More specifically, in the related art, when the accelerator is momentarily turned off at the same timing as the alarm start and then the accelerator pedal was immediately pressed back down, not intended accelerator override may have occurred. On the other hand, according to the aspects of (1), (5) and (6), it is possible to reduce the likelihood of such unintentional accelerator overrides occurring.

In addition, in the related art, there were cases where the driver did not notice the notification until the notification have changed from notification by a display to notification by sound. On the other hand, according to the aspect of (2), the likelihood that the driver will perform the accelerator pedal operation without noticing the notification, resulting in an unintended accelerator override, is reduced.

In addition, according to the aspect of (3), it is easier for the driver who has the intention of using the accelerator override to use the accelerator override. Accordingly, for an accelerator override that is not based on an intention, the likelihood of the accelerator override occurring can be reduced, and for an accelerator override that is based on an intention, it can be made easier to implement the accelerator override.

In addition, according to the aspect of (1) and (2), the likelihood of the accelerator override occurring without the driver noticing is reduced, but there is a possibility that the display will go unnoticed. According to the aspect of (4), by having the vehicle decelerate, the driver will notice that the vehicle is decelerating even though the driver is operating the accelerator pedal, increasing the likelihood that the driver will recognize the curve.

BRIEF DESCRIPTION OF THE DRAWINGS

FIG. 1 is a configuration view of a vehicle system using a vehicle control system according to a first embodiment.

FIG. 3 is a view for describing a reference value for determining execution of accelerator override and execution of the accelerator override based on the reference value.

FIG. 4 is a view for describing a reference value for determining execution of the accelerator override and execution of the accelerator override based on the reference value.

FIG. 8 is a view for describing an example of a situation in which accelerator override occurs not intended by a driver.

DETAILED DESCRIPTION OF THE INVENTION

Figure 2:
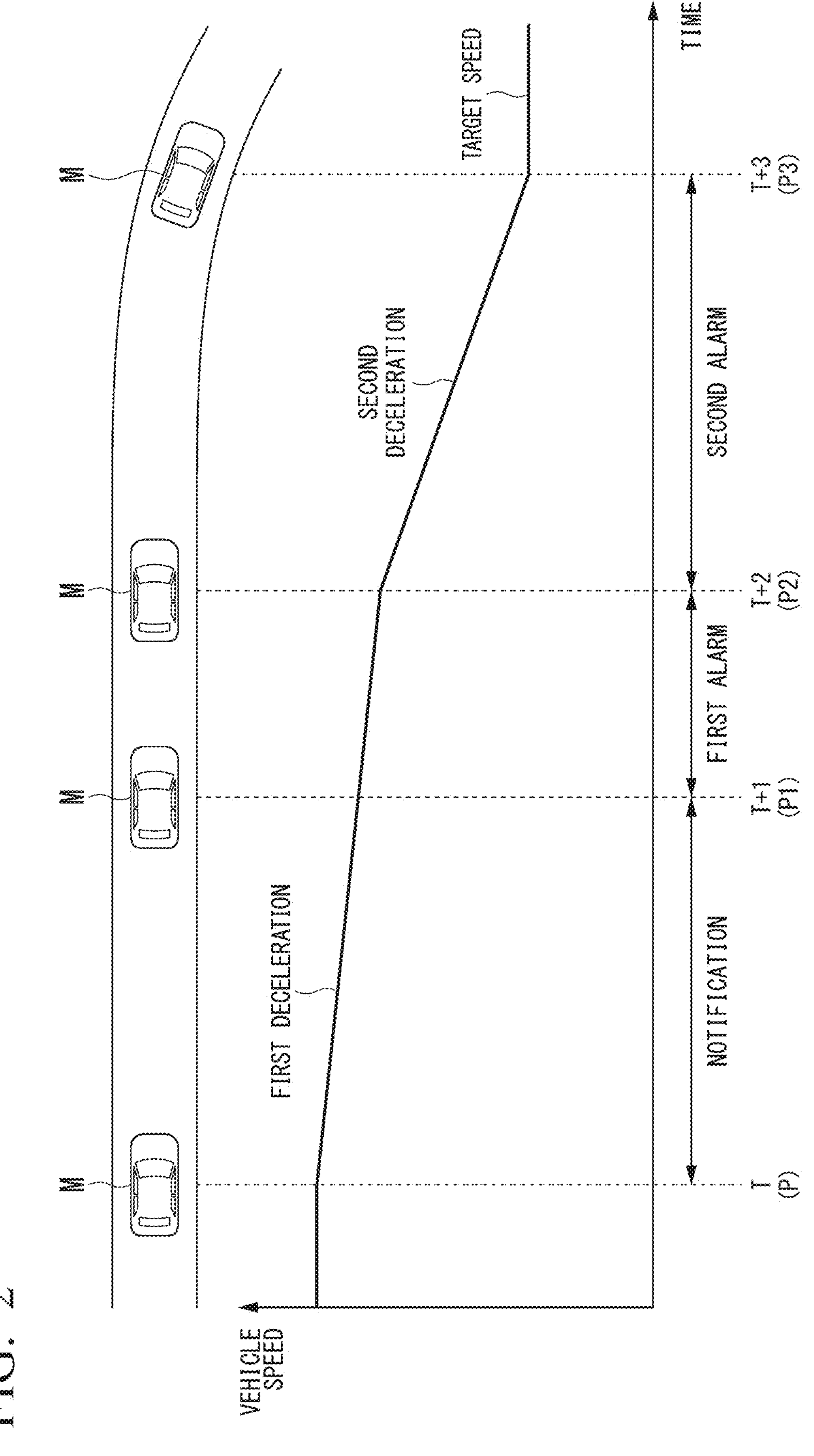
FIG. 2 is a view showing an example of driver assistance control.

Hereinafter, embodiments of a vehicle control device, a vehicle control method, and a program stored in a storage medium of the present invention will be described with reference to the accompanying drawings.

First Embodiment

[Entire Configuration]

FIG. 1 is a configuration view of a vehicle system 1 using a vehicle control system according to an embodiment. A vehicle in which the vehicle system 1 is mounted is, for example, a two-wheeled, three-wheeled or four-wheeled vehicle, and a driving source thereof is an internal combustion engine such as a diesel engine or a gasoline engine, an electric motor, or a combination of these. The electric motor runs on electricity generated by a generator connected to the internal combustion engine, or on electricity discharged from a secondary battery or fuel cells.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driver monitor camera 70, a driving operator 80, a driver assistance device 100, a traveling driving force output device 200, a brake device 210, and a steering device 220. These devices and equipment are connected to each other by multiple communication lines, such as a controller area network (CAN) communication line, serial communication lines, wireless communication networks, or the like. Further, the configuration shown in FIG. 1 is merely an example, and some of the configuration may be omitted, or other configurations may be added. The driver assistance device 100 is an example of "a vehicle control device."

The camera 10 is a digital camera using a solid-state imaging device such as a charge coupled device (CCD), a complementary metal oxide semiconductor (CMOS), or the like. The camera 10 is attached to an arbitrary place on a vehicle in which the vehicle system 1 is mounted (hereinafter, a vehicle M). When capturing an image of the front, the camera 10 is attached to a front windshield upper portion, a rearview mirror back surface, or the like. The camera 10 captures images of the surroundings of the vehicle M repeatedly, for example, periodically. The camera 10 may be a stereo camera.

The radar device 12 emits radio waves, such as millimeter waves, around the vehicle M and detects the radio waves reflected by objects (reflected waves) to determine at least a position (distance and azimuth) of the object. The radar device 12 is attached to an arbitrary place on the vehicle M. The radar device 12 may detect the position and speed of the object using a frequency modulated continuous wave (FM-CW) method.

The LIDAR 14 emits light (or electromagnetic waves with a wavelength close to the light) to the surroundings of the vehicle M, and measures scattered light. The LIDAR 14 detects the distance to the subject on the basis of the time between light emission and reception. The emitted light is, for example, a pulsed laser beam. The LIDAR 14 is attached to an arbitrary place on the vehicle M.

The object recognition device 16 performs sensor fusion processing on some or all of the detection results from the camera 10, the radar device 12, and the LIDAR 14 to recognize the position, the type, the speed, or the like, of the object. The object recognition device 16 outputs the recognition results to the driver assistance device 100. The object recognition device 16 may output the detection results of the camera 10, the radar device 12, and the LIDAR 14 to the driver assistance device 100 without modifying them. The object recognition device 16 may be omitted from the vehicle system 1.

The communication device 20 communicates with other vehicles in the vicinity of the vehicle M using, for example, a cellular network, a Wi-Fi network, Bluetooth (Registered trademark), dedicated short range communication (DSRC), etc., or communicates with various server devices via a wireless base station.

The HMI 30 presents various pieces of information to the occupant of the vehicle M and accepts input operations from the occupant. The HMI 30 includes various display devices, a speaker, a buzzer, a touch panel, a switch, a key, and the like. The HMI 30 includes a display device. The display device (display part) is, for example, a display device, so-called multi-information display, that is provided in a center portion of an installation panel of the vehicle M and displays various information about the vehicle M, such as a speed meter (speedometer) that indicates the traveling speed of the vehicle M, a rotation speed meter (tachometer) that indicates the rotation number (rotation speed) of the internal combustion engine equipped in the vehicle M, or the like.

The vehicle sensor 40 includes a vehicle speed sensor configured to detect a speed of the vehicle M, an acceleration sensor configured to detect acceleration, a yaw rate sensor configured to detect an angular speed around a vertical axis, an azimuth sensor configured to detect an orientation of the vehicle M, and the like.

The navigation device 50 includes, for example, a global navigation satellite system (GNSS) receiver 51, a navigation HMI 52, and a route determining part 53. The navigation device 50 holds first map information 54 on a storage device such as a hard disk drive (HDD), a flash memory, or the like. The GNSS receiver 51 specifies a position of the vehicle M on the basis of the signal received from a GNSS satellite. The position of the vehicle M may be specified or supplemented by an inertial navigation system (INS) using the output of the vehicle sensor 40. The navigation HMI 52 includes a display device, a speaker, a touch panel, a key, and the like. The navigation HMI 52 may be partially or completely shared with the HMI 30 described above. The route determining part 53 determines, for example, a route (hereinafter, a route on map) to a destination input by an occupant using the navigation HMI 52 from a position of the vehicle M (or an arbitrary position that was input) specified by the GNSS receiver 51 with reference to the first map information 54. The first map information 54 is, for example, information that represents a shape of a road using links that indicate roads and nodes connected by the links. The first map information 54 may include a curvature of a road, point of interest (POI) information, or the like. The route on map is output to the MPU 60. The navigation device 50 may perform route guidance using the navigation HMI 52 on the basis of the route on map. The navigation device 50 may be realized by, for example, a function of a terminal device such as a smartphone, a tablet terminal, or the like, held by the occupant. The navigation device 50 may transmit the current position and destination to a navigation server via the communication device 20, and acquire the same route as the route on map from the navigation server.

The MPU 60 includes, for example, a recommended lane determining part 61 and stores second map information 62 in a storage device such as a HDD, a flash memory, or the like. The recommended lane determining part 61 divides the route on map provided by the navigation device 50 into a plurality of blocks (for example, every 100 m in terms of a direction of advance of the vehicle) and determines a recommended lane for each block by referring to the second map information 62. The recommended lane determining part 61 determines which lane from the left to travel in. The recommended lane determining part 61 determines the recommended lane for the vehicle M when a branch point exists on the route on map, so that the vehicle M can travel a reasonable route to proceed to the branch destination.

The second map information 62 is map information more accurate than the first map information 54. The second map information 62 includes, for example, information of a lane center, information of a lane boundary, or the like. In addition, the second map information 62 may include road information, traffic regulation information, address information (address and postal code), facility information, telephone number information, and the like. The second map information 62 may be updated at any time by the communication device 20 communicating with other devices. The second map information 62 includes information such as a position of a curved road, a curvature of the curved road, a curve radius of the curved road, a slope of the curved road, and the like. These pieces of information may be included in the first map information 54. In addition, the second map information 62 or the first map information 54 may include information indicating whether the road is a curved road, which is a subject of assistance control described below.

The driver monitor camera 70 is, for example, a digital camera using a solid-state imaging device such as a CCD, a CMOS, or the like. The driver monitor camera 70 is attached to an arbitrary place in the vehicle M in a position and orientation that enables the camera to image a portion of the head of the occupant (hereinafter referred to as the driver) seated in the driver's seat of the vehicle M from the front surface (in an orientation that images the face). For example, the driver monitor camera 70 is attached to an upper portion of the display device installed in the center portion of the installment panel of the vehicle M. The driver monitor camera 70 outputs an image captured from its installed position of the vehicle compartment including the driver of the vehicle M to the driver assistance device 100.

The driving operator 80 includes, for example, a brake pedal 82, an accelerator pedal 84, a steering wheel, an operation switch of a direction indicator, a shift lever, and other operators. The driving operator 80 is equipped with a sensor configured to detect the amount of operation or the presence or absence of operation, and the detection results are output to the driver assistance device 100, or some or all of the traveling driving force output device 200, the brake device 210, and the steering device 220. The steering wheel does not necessarily have to be circular, and may be in the form of an irregular steering wheel, a joystick, a button, or the like. A brake pedal sensor (BP sensor) 86 is attached to the brake pedal 82. An accelerator pedal sensor (AP sensor) 88 is attached to the accelerator pedal 84.

The BP sensor 86 detects an opening angle of the brake pedal 82 varied according to an operation of the driver with respect to the brake pedal 82. The AP pedal sensor 88 detects an opening angle of the accelerator pedal varied according to an operation of the driver with respect to the accelerator pedal 84.

The driver assistance device 100 includes, for example, a recognition part 110, a driver recognition part 120, a curve determining part 130, an operation information processing part 140, an assistance controller 150, and a storage part 190. Some or all of these functional parts are realized by executing, for example, a program (software) using a hardware processor such as a central processing unit (CPU) or the like. Some or all of these components may be realized by hardware (circuit part; including circuitry) such as large scale integration (LSI), a application specific integrated circuit (ASIC), a field-programmable gate array (FPGA), a graphics processing unit (GPU), or the like, or cooperation of software and hardware. The program may be stored in a storage device such as an HDD, a flash memory, or the like, (a storage device including a non-transitory storage medium) of the driver assistance device 100, or may be stored in a detachable storage medium such as a DVD, a CD-ROM, or the like, in advance, or may be installed in a HDD or a flash memory of the driver assistance device 100 by mounting a storage medium (non-transitory storage medium) in a drive device. The curve determining part 130 is an example of a first acquisition part, the operation information processing part 140 is an example of a second acquisition part, and the assistance controller 150 is an example of a controller.

The storage part 190 is realized by, for example, an HDD, a flash memory, an electrically erasable programmable read only memory (EEPROM), a read only memory (ROM), a random access memory (RAM), or the like.

The recognition part 110 recognizes a state of the object around the vehicle M such as a position, a speed, acceleration, or the like, on the basis of the information input from the camera 10, the radar device 12, and the LIDAR 14 via the object recognition device 16. The position of the object is recognized, for example, as a position on absolute coordinates using a representative point (a center of gravity, a driving shaft center, or the like) of the vehicle M as an origin, and used in control. The position of the object may be expressed by a representative point such as a center of gravity, corners of the object, or may be expressed by a region. The "state" of the object may include acceleration or jerk of the object, or "a behavioral state" (for example, whether lane change is performed or to be performed).

The recognition part 110 recognizes, for example, the lane in which the vehicle M is traveling (traveling lane). For example, the recognition part 110 recognizes the traveling lane by comparing a pattern of road division lines (for example, an arrangement of solid lines and broken lines) obtained from the second map information 62 with a pattern of road division lines around the vehicle M recognized from the image captured by the camera 10. The recognition part 110 may recognize a traveling lane by recognizing track boundaries (road boundaries), which are not limited to the road division lines but include road division lines, shoulders, curbs, median strips, guard rails, and the like. This recognition may take into account the position of the vehicle M obtained from the navigation device 50 and the processing results from the INS. The recognition part 110 recognizes stop lines, obstacles, red signals, toll gates, and other road incidents.

When recognizing the traveling lane, the recognition part 110 recognizes the position or posture of the vehicle M relative to the traveling lane. The recognition part 110 may recognize, for example, a deviation of the reference point of the vehicle M from the lane center and an angle of the direction of advance of the vehicle M relative to a line connecting the lane centers as the relative position and posture of the vehicle M with respect to the traveling lane. On the other hand, the recognition part 110 may recognize the position of the reference point of the vehicle M relative to any side end portion of the traveling lane (road division lines or road boundaries) as the relative position of the vehicle M relative to the traveling lane.

The driver recognition part 120 detects whether the driver is in a predetermined state on the basis of the image captured by the driver monitor camera 70. The predetermined state is a state in which hands-off lane maintenance control described below can be executed. Hands-off is a state in which the driver is not holding the steering wheel, and hands-on is a state in which the driver is holding the steering wheel. A state in which hands-off lane maintenance control is executable is a state in which the driver is monitoring the front (or the area around the vehicle M). Monitoring the front means that the driver is monitoring the front so that, for example, the driver can quickly take over from control of the vehicle M by the vehicle system 1 to operation of the vehicle M by the driver. Monitoring the front means that, for example, the driver's eye are directed forward. Whether the driver has his/her hands on or off is determined on the basis of the detection result of the grip sensor configured to detect a grip state of the steering wheel (not shown).

The curve determining part 130 acquires first information related to a curved road existing in a direction of advance of the vehicle M. The first information related to the curved road is information related to, for example, a position of the curved road, a shape of the curved road, or the like. The curve determining part 130 specifies the position of the curved road with respect to the vehicle M on the basis of, for example, the position of the vehicle M and the first information.

The operation information processing part 140 acquires second information related to an acceleration operation of the driver of the vehicle M. The second information is information indicating, for example, an accelerator pedal opening output from the AP pedal sensor 88. The operation information processing part 140 acquires information related to the deceleration operation of the driver of the vehicle M. For example, the operation information processing part 140 acquires information indicating the brake pedal opening angle output from the BP sensor 86.

The assistance controller 150 assists the driver in controlling the vehicle M. The assistance controller 150 automatically controls the traveling driving force output device 200 and the brake device 210, for example, without relying on the driver's operation, and automatically controls the speed of the vehicle M. The assistance controller 150 executes so-called adaptive cruise control (ACC).

The assistance controller 150 automatically controls the traveling driving force output device 200 and the brake device 210, without relying on the driver's operation, so that the vehicle M travels at a speed set in advance according to the speed set by the driver, the legal speed, and the road, for example, when there is no other vehicle ahead of the vehicle M within a predetermined distance from the vehicle M.

For example, when there is another vehicle ahead of the vehicle M within a predetermined distance from the vehicle M, the assistance controller 150 automatically controls the traveling driving force output device 200 and the brake device 210 so as to follow the other vehicle, without relying on the driver's operation. Following means that the vehicle M is traveling behind another vehicle while maintaining a predetermined distance from the other vehicle.

The assistance controller 150 controls the steering device 220 so that the vehicle M does not deviate from the traveling lane. For example, the assistance controller 150 controls the steering device 220 so that the vehicle M travels in the center or near the center of the traveling lane recognized by the recognition part 110. The assistance controller 150 performs, for example, hands-off lane maintenance control that can control the steering of the vehicle M in a state in which the driver is not holding the steering wheel, or hands-on lane maintenance control that can control the steering of the vehicle M in a state in which the driver is holding the steering wheel.

The assistance controller 150 makes the vehicle M automatically change lanes. The assistance controller 150 generates, for example, an orbit for a lane change and causes the vehicle M to change lanes so that the vehicle M travels along the generated orbit. The assistance controller 150 makes the vehicle M change lanes (auto lane change (ALC)) on the basis of the destination set by the occupant and the recommended lane output by the MPU 60.

The assistance controller 150 may automatically cause the vehicle M to change lanes when instructed to do so by the driver. The lane change instruction is the operation of the lever portion of the operation switch of the direction indicator. For example, when the driver operates the lever portion in the direction he/she wants the vehicle M to change lanes, the vehicle M will change lanes in the direction corresponding to the operation. The lane change instruction may be an operation different from the operation of the lever portion of the operation switch of the direction indicator. For example, when a predetermined operation button is pushed, the lane change may be performed. Some or all of the controls of the assistance controller 150 may be omitted.

Further, when entering a curved road or while traveling on the curved road, the assistance controller 150 assists the driver by decelerating the vehicle M to a speed appropriate for the curved road and notifying the driver about the deceleration so that the vehicle M can travel on the curved road smoothly. Hereinafter, the control may be referred to as assistance control.

The traveling driving force output device 200 outputs a traveling driving force (torque) to the driving wheels so that the vehicle M travels. The traveling driving force output device 200 includes a combination of, for example, an internal combustion engine, an electric motor, and a gearbox, as well as an ECU that controls these. The ECU controls the above configuration according to the information input from the assistance controller 150 or the information input from the driving operator 80.

The brake device 210 includes, for example, a brake caliper, a cylinder configured to transmit a hydraulic pressure to the brake caliper, an electric motor configured to generate a hydraulic pressure in the cylinder, and a brake ECU. The brake ECU controls the electric motor according to the information input from the assistance controller 150 or the information input from the driving operator 80 so that the brake torque corresponding to the braking operation is output to each wheel.

The steering device 220 includes, for example, a steering ECU, and an electric motor. The electric motor applies, for example, a force to a rack and pinion mechanism to change a direction of a steered wheel. The steering ECU drives the electric motor and changes the direction of the steered wheels according to the information input from the assistance controller 150 or the information input from the driving operator 80.

[Assistance Control]

The assistance controller 150 performs assistance control, which is one or both of deceleration control, which decelerates the vehicle M so that the speed of the vehicle M approaches a target speed according to the curved road, and notification control, which notifies (alarms) the speed of the vehicle M to approach the target speed, while the vehicle M is traveling a section (predetermined section) from the entrance to the curved road to a predetermined distance before the entrance or while the vehicle M is traveling on the curved road. The assistance control is processing that is executed when, for example, the driver assistance device 100 is not automatically controlling the speed of the vehicle M (for example, ACC is not operating) and the driver is controlling the speed of the vehicle M. The target speed is a speed that is determined by factors such as the shape of the curved road and the legal speed of the curved road.

The subject of assistance control may be the curved road that satisfies a condition. The condition is, for example, that the curve radius is within a predetermined range. The predetermined range is the curve radius that needs to be decelerated when the vehicle M is traveling.

The assistance control may be performed on the condition that the speed of the vehicle M is below a predetermined speed. The predetermined speed is a speed that does not deviate more than the predetermined speed from the speed limit or the recommended speed of the curved road or before or after the curved road. The predetermined speed is, for example, a speed obtained by adding the setting speed (for example, 30 km/h) to the speed limit or the recommended speed described above.

The assistance control may be performed when the state of the road surface satisfies the criteria. Satisfying the criteria means, for example, that the road surface is not frozen and there are no incidents that affect braking. For example, the recognition part 110 may recognize the situation of the road surface on the basis of the detection result of the object recognition device 16, or the driver assistance device 100 may recognize the situation of the road surface on the basis of information provided by another device. The assistance control may be performed when a slope of the curved road is below a threshold.

FIG. 2 is a view for describing assistance control. A time T is the timing when the vehicle M reaches a position P a predetermined distance before the entrance to the curved road. The position before the predetermined distance is a position that is set in advance depending on the target speed. For example, the position before the predetermined distance is set to a position farther from the entrance to the curved road as the deviation between the speed of the vehicle M and the target speed is increased. The position before the predetermined distance is set at a position that ensures the time when a predetermined notification will be made, the time when a predetermined first alarm will be issued, and the time a the predetermined second alarm will be issued when the brake override or the accelerator override is not performed, as described below.

The vehicle M passes through the position P, and then, passes through the positions P1, P2 and P3, in that order. The time when the vehicle M arrives at the position P is time T, the time when the vehicle M arrives at the position P1 is time T+1, the time when the vehicle M arrives at the position P2 is time T+2, and the time when the vehicle M arrives at the position P3 is time T+3. The entrance to the curved road is provided between the position P2 and the position P3. The entrance to the curved road is, for example, the position where the road (lane) begins to curve, or the position where the road curves more than the threshold.

At the time T, when the speed of the vehicle M is greater than the target speed, the assistance controller 150 notifies the driver and decelerates the vehicle M at the first deceleration degree. The notification is to alert the driver to the curved road. The notification is, for example, a notification that the vehicle M is approaching a curved road in a state where the speed of the vehicle M is greater than the target speed, or a notification to start assistance control to decelerate the vehicle M so that the speed of the vehicle M approaches the target speed. The notification is performed via, for example, the HMI 30. The notification may be a notification by an image, or may be a notification by a sound or a vibration (for example, vibrating the seatbelts).

At the time T+1, the assistance controller 150 issues a first alarm to the driver. The first alarm is an alarm that alerts the driver to a curved road. The first alarm is, for example, an alarm for the driver that causes the vehicle M to decelerate so that the speed of the vehicle M approaches the target speed (or falls below the target speed).

At the time T+2, the assistance controller 150 issues a second alarm to the driver, decelerates the vehicle M with a second deceleration degree, and matches the speed of the vehicle M to the target speed at the time T+3. The second deceleration degree is a deceleration degree greater than the first deceleration degree. The second alarm is an alarm that alerts the driver to a curved road. The second alarm is an alarm for the driver that causes the vehicle M to decelerate so that the speed of the vehicle M approaches the target speed (or falls below the target speed). The second alarm is a stronger alarm than the first alarm. The strong alarm is one that makes the driver feel the need to decelerate more. The strong alarm means, for example, that the assistance controller 150 provides an image that encourages the driver to decelerate, outputs a louder sound, or gives a larger vibration to the driver.

[Override of Acceleration Operation (Accelerator Override)]

As described above, the assistance controller 150 provides assistance to the vehicle M traveling on a curved road. Accordingly, it is possible to assist the driver's operation so that the vehicle M travels smoothly along a curved road at the target speed. However, some drivers may find the assistance control by the assistance controller 150 (especially the deceleration control) annoying, or may have an intention to execute acceleration rather than deceleration of the vehicle M.

With the above-mentioned circumstances as a background, when the assistance controller 150 acquires second information indicating that the driver has performed an acceleration operation while the assistance control is being performed, the assistance controller 150 acquires the accelerator pedal opening output from the AP pedal sensor 88 from the acquired second information, and determines whether the accelerator pedal opening has increased from the reference value by or more than the predetermined value within a predetermined period (for example, a few seconds). Here, the beginning of the predetermined period may be, for example, the timing when the driver has operated the accelerator pedal 84 while assistance control is being executed, or a timing when the driver has operated the accelerator pedal 84 with an operation amount that is equal to or greater than the predetermined degree. The assistance controller 150 stops the assistance control and accelerates the vehicle M when it is determined that the accelerator pedal opening has increased from the reference value by more than the prescribed value within the prescribed period. Hereinafter, the control may be referred to as the accelerator override. The accelerator pedal opening is an example of "an acceleration operation amount." Alternatively, the assistance controller 150 may measure an accumulation value of an increment of the accelerator pedal opening within the predetermined period and determine whether the measured accumulation value is equal to or greater than the predetermined value. Hereinafter, with reference to FIG. 3 and FIG. 4, the setting of the reference value for determining the execution of the accelerator override will be described.

FIG. 3 is a view for describing a reference value RV1 for determining execution of the accelerator override and execution of the accelerator override based on the reference value RV1. In FIG. 3, from the time T, the assistance controller 150 executes the assistance control, thereby decelerating the vehicle M at the first deceleration degree and issuing a notification or a first alarm via the HMI 30. The driver feels the change in gravity (vertical G) related to the direction of advance of the vehicle M as the vehicle M decelerates, and further recognizes that a curved road is approaching through the notification or the first alarm via the HMI. Here, it is assumed that the driver has recognized the above situation, but did not wish to the application of the assistance control and initiated an acceleration operation at the time T+2.

In response to the driver starting the acceleration operation, the assistance controller 150 acquires the second information indicating that the driver has performed the acceleration operation, and acquires the accelerator pedal opening output from the AP pedal sensor 88 from the acquired second information. Next, the assistance controller 150 determines whether the accelerator pedal opening has increased from the reference value RV1 by more than a predetermined value within a predetermined period. Here, the reference value RV1 is a value of the accelerator pedal opening at the time T when the assistance control by the assistance controller 150 is started. At the time T+2 #, the assistance controller 150 determines that the accelerator pedal opening has increased from the reference value RV1 by more than the predetermined value within the predetermined period, and stops the assistance control and accelerates the vehicle M in accordance with the accelerator pedal opening (executes the accelerator override). Accordingly, it is possible to realize the vehicle control according to the driver's intention. Further, by setting the reference value RV1 to the accelerator pedal opening value at the start of the assistance control, the operation amount required to perform the accelerator override is set to the same criteria, making it easier for the driver to understand the operation amount required to perform the accelerator override.

FIG. 4 is a view for describing a reference value RV2 for determining execution of the accelerator override and execution of the accelerator override based on the reference value RV2. In FIG. 4, from the time T, the assistance controller 150 executes the assistance control, thereby decelerating the vehicle M at the first deceleration degree and issuing the notification or the first alarm via the HMI 30. The driver feels the change in gravity (vertical G) related to the direction of advance of the vehicle M as the vehicle M decelerates, and further recognizes that the curved road is approaching through the notification or the first alarm via the HMI. The driver recognized the above situation, but did not wish to apply the assistance control and the attempted accelerator override.

Here, unlike the situation shown in FIG. 3, the accelerator pedal opening value at the time T when the assistance control begins is close to the upper limit, so it may be impossible to increase the accelerator pedal opening value by more than the predetermined value using this value as the reference value. For this reason, the assistance controller 150 sets the minimum value of the accelerator pedal opening during execution of the assistance control as the reference value RV2, and determines whether the accelerator pedal opening has increased from the reference value RV2 by more than the predetermined value within the predetermined period. For example, in the case of FIG. 4, at the time T+3, when the driver releases the accelerator pedal 84, the accelerator pedal opening reaches its minimum value, so the assistance controller 150 sets the accelerator pedal opening value at the time T+3 as the reference value RV2. After that, the assistance controller 150 determines that, at the time T+4, the accelerator pedal opening has increased from the reference value RV2 by more than the predetermined value, and stops the assistance control and accelerates the vehicle M in accordance with the accelerator pedal opening (executes the accelerator override). Accordingly, it is possible to realize the vehicle control in accordance with the driver's intention. Further, by setting the reference value RV2 to the minimum value of the accelerator pedal opening during execution of the assistance control, the driver can be made to execute an override even if the accelerator pedal opening value at the start of assistance control is large and the margin to the maximum operation amount is less than the predetermined value.

Further, the reference value RV2 may be set by the assistance controller 150 only if it is not possible to increase the accelerator pedal opening value by more than the predetermined value from the value at the time T when the assistance control is started, or it may be set, together with the reference value RV1, at all times during the execution of the assistance control.

Effects

Figure 5:
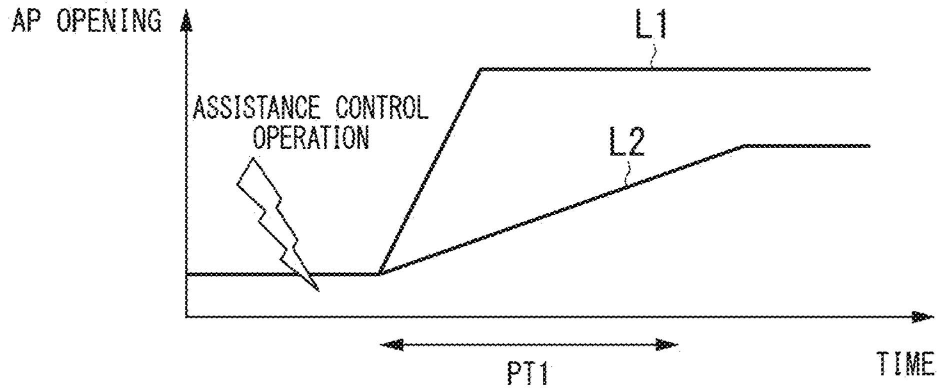
FIG. 5 is a view for describing effects of the accelerator override according to the first embodiment.

FIG. 5 is a view for describing effects of the accelerator override according to the embodiment. A vertical axis indicates an accelerator pedal opening, and a lateral axis indicates time. The assistance controller 150 stops the assistance control, for example, when the acceleration operation amount for the accelerator pedal 84 has reached a threshold in a time period which is from a start of the operation of the accelerator pedal 84 in order to accelerate the vehicle M until a predetermined period PT1 has elapsed. When the accumulated operation amount has not reached the threshold before a predetermined period P1 has elapsed, the assistance control continues even if the driver is operating the accelerator pedal 84.

The condition of the accelerator override is satisfied even if the accelerator pedal 84 is operated so that the accelerator pedal opening changes significantly in a short period as in a trend line L1 (for example, in the case of FIG. 4), or even if the accelerator pedal 84 is operated so that the accelerator pedal opening changes gradually as in a trend line L2 (for example, in the case of FIG. 3). Accordingly, even if the driver performs the operation that significantly increases the opening angle of the operator in a short time or the operation that gradually increases the opening angle over time, the driver can override the assistance control through the acceleration operation and control the vehicle according to the driver's intention.

[Flowchart]

Figure 6:
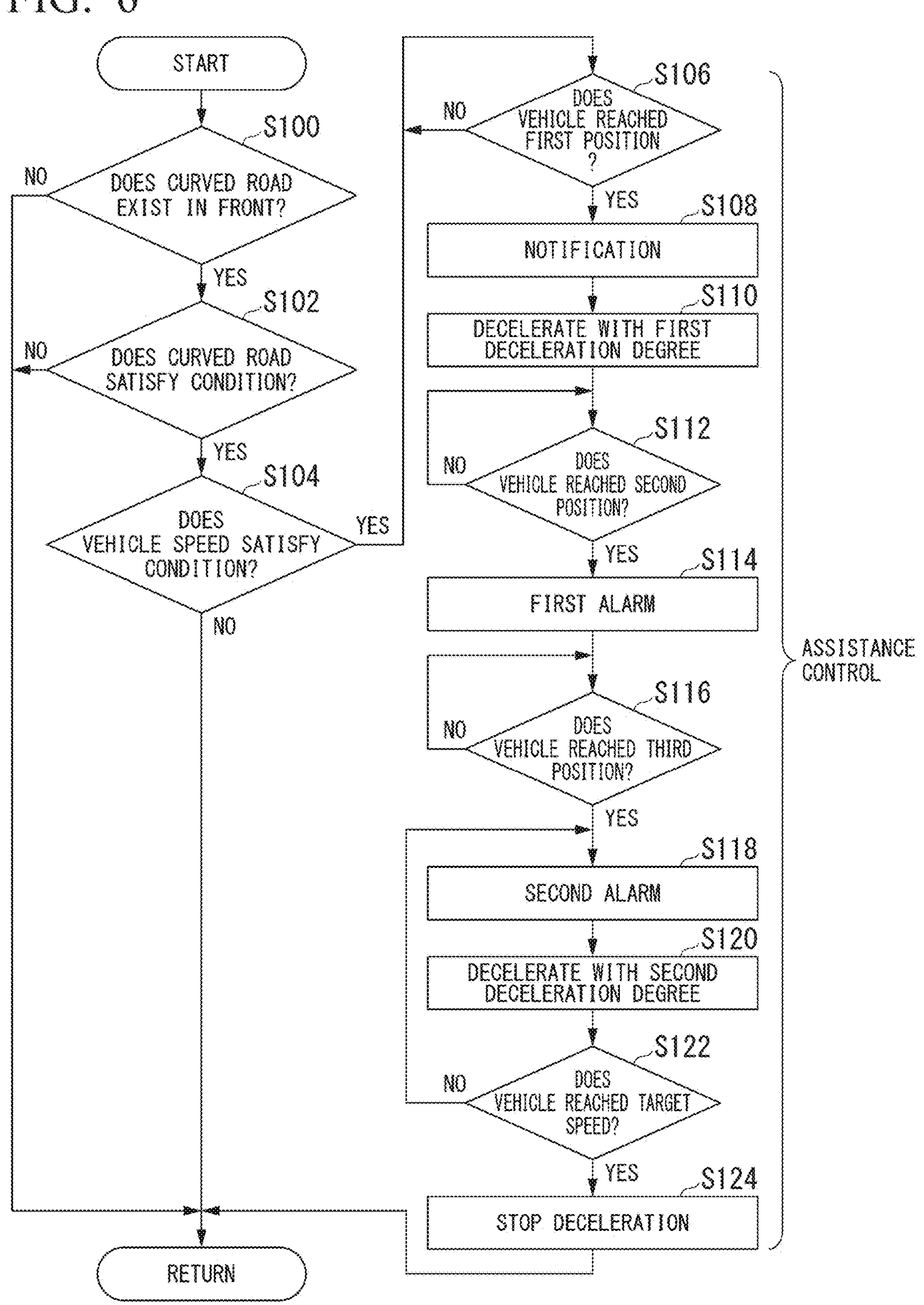
FIG. 6 is a flowchart showing an example of a flow of processing executed by a driver assistance device in the first embodiment.

FIG. 6 is a flowchart showing an example of a flow of processing executed by the driver assistance device 100. The order of the processing in this flowchart may be changed, and some of the processing may be omitted.

First, the driver assistance device 100 determines whether a curved road exists ahead of the vehicle M by a predetermined distance from the position of the vehicle M (step S100). When a curved road exists, the driver assistance device 100 determines whether the curved road satisfies the condition (step S102). When the curved road is a curved road that satisfies the condition, the driver assistance device 100 determines whether the speed of the vehicle M satisfies the condition (step S104). When the determination in steps S100 and S102 or S104 is negative, processing of one routine of the flowchart is terminated.

When the speed of the vehicle satisfies the condition, the driver assistance device 100 determines whether the vehicle M has reached a first position (for example, the position P in FIG. 2) (step S106). When the vehicle M reaches the first position, the driver assistance device 100 performs a notification (step S108) and decelerates the vehicle M with the first deceleration degree (step S110).

Next, the driver assistance device 100 determines whether the vehicle M has reached a second position (for example, the position P1 in FIG. 2) (step S112). When the vehicle M reaches the second position, the driver assistance device 100 issues a first alarm (step S114). Next, the driver assistance device 100 determines whether the vehicle M reaches a third position (for example, the position P2 in FIG. 2) (step S116).

When the vehicle M reaches the third position, the driver assistance device 100 issues a second alarm (step S118), and decelerates the vehicle M with the second deceleration degree (step S122). Next, it is determined whether the speed of the vehicle M reaches the target speed (step S122). When the speed of the vehicle M does not reach the target speed, the processing returns to step S118. When the speed of the vehicle M reaches the target speed, the driver assistance device 100 stops the deceleration of the vehicle M (step S124). Accordingly, processing of one routine of the flowchart is terminated.

As described above, when the vehicle M and the curved road satisfy the condition, the driver assistance device 100 executes assistance control (steps S106 to S124) to assist the driver so that the vehicle M can travel on the curved road more smoothly.

In the processing of the above-mentioned flowchart, if the accelerator override is satisfied, the assistance control stops.

Figure 7:
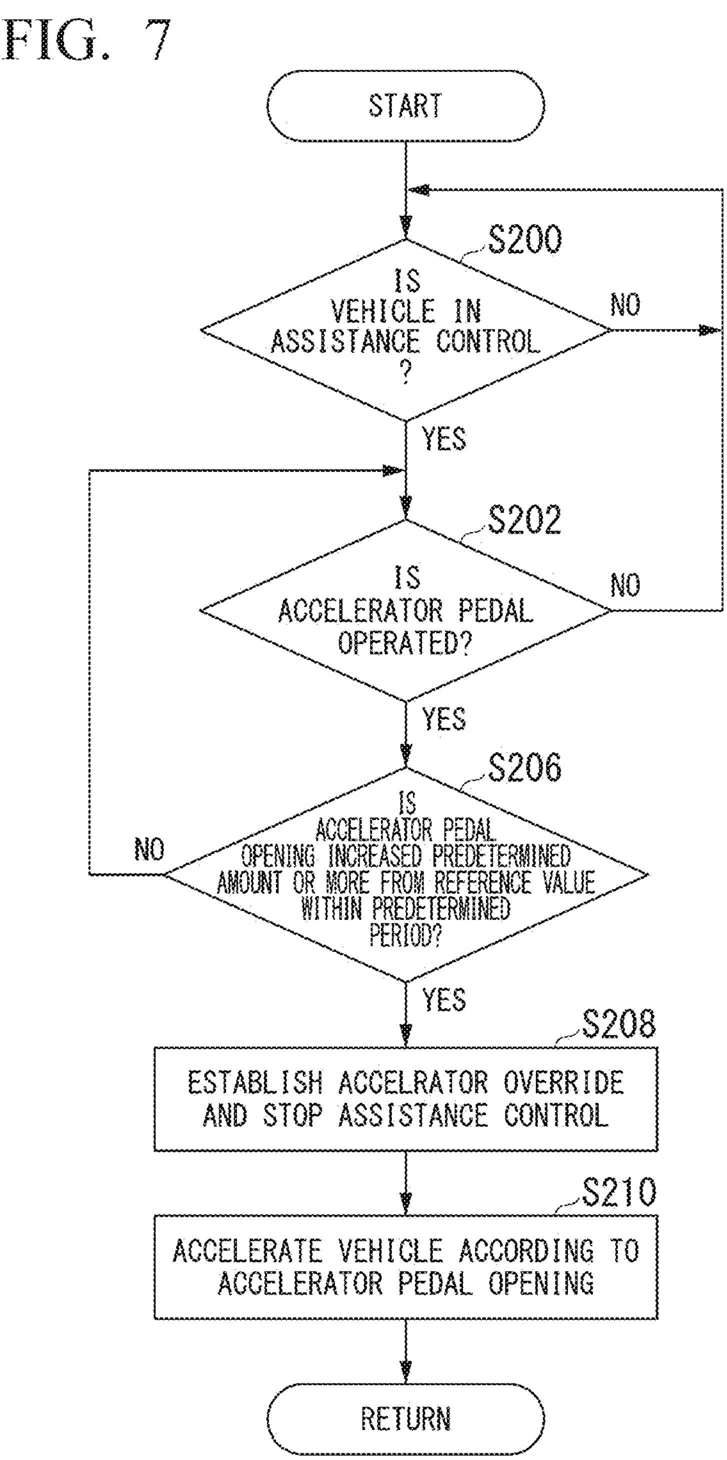
FIG. 7 is a flowchart showing an example of processing of the accelerator override executed by the driver assistance device in the first embodiment.

FIG. 7 is a flowchart showing an example of processing of the accelerator override executed by the driver assistance device 100. First, the driver assistance device 100 determines whether it is in the assistance control (step S200). When the assistance control is in progress, the driver assistance device 100 determines whether the accelerator pedal 84 is in operation (step S202). When it is determined that the accelerator pedal 84 is not operated, the driver assistance device 100 returns the processing to step S200.

Meanwhile, when it is determined that the accelerator pedal 84 is in operation, the driver assistance device 100 determines whether the accelerator pedal opening has increased from the reference value by more than the predetermined value within the predetermined period (step S206). When it is determined that the accelerator pedal opening has not increased from the reference value by more than the predetermined value within the predetermined period, the driver assistance device 100 returns the processing to step S202.

When it is determined that the accelerator pedal opening has increased from the reference value by more than the predetermined value within the predetermined period, the driver assistance device 100 determines that the accelerator override has been established, and stops the assistance control shown in the flowchart of FIG. 7 (step S208). Next, the driver assistance device 100 accelerates the vehicle M in response to the accelerator pedal opening (step S210). Accordingly, the processing of the flowchart is terminated.

Further, the reference value in step S206 described above may use at least one of the reference value RV1 of FIG. 3 and the reference value RV2 of FIG. 4. For example, in step S206, the driver assistance device 100 may determine whether the accelerator pedal opening has increased from either one of the reference value RV1 and the reference value RV2 by more than the predetermined value within the predetermined period. Accordingly, even in any one of the case in which the driver performs an operation that significantly increases the opening angle of the operator in a short time (corresponding to the reference value RV2) or the case in which the driver performs an operation that gradually increases the opening angle over time (corresponding to the reference value RV1), the driver can override the assistance control through the acceleration operation and control the vehicle according to the driver's intention.

Second Embodiment

In the first embodiment, it has been described that the assistance controller 150 determines whether the accelerator pedal opening has increased by more than the prescribed value from the reference value within the prescribed period while assistance control is being performed, and determines that the accelerator override has been established if it is determined that the accelerator pedal opening has increased by more than the prescribed value from the reference value within the prescribed period. In addition, in the first embodiment, the reference value RV2 is set to the minimum value of the accelerator pedal opening during execution of the assistance control, so that the driver can execute the accelerator override even if the accelerator pedal opening value at the start of assistance control is large and the margin to the maximum operation amount is less than the predetermined value. However, in this case, in a specified situation, the accelerator pedal operation of the driver may induce an accelerator override not intended by the driver, which may result in the assistance control being released not intended by the driver.

FIG. 8 is a view for describing an example of a situation in which the accelerator override occurs not intended by the driver. In the example in such a situation, FIG. 8 shows a situation in which the driver releases the accelerator pedal as soon as the assistance control begins, and then, immediately presses the accelerator pedal again. In this case, the reference value of the accelerator pedal opening is set to the reference value RV2 by the acceleration operation (releasing the accelerator pedal) that is performed at the same time as the assistance control begins at the time T. In addition, after the driver releases the accelerator pedal, the driver immediately presses it again, so the accelerator pedal opening reaches a new reference value RV2 within a short time, the accelerator override is established, and the assistance control is released (the time T+5). In this way, if the assistance control is initiated but then released immediately, the driver will have a hard time realizing that the assistance control has been activated. Further, because the driver is releasing the accelerator pedal, even if the driver feels a deceleration (first deceleration), the driver will likely mistakenly believe that it was due to his or her own accelerator pedal operation. For this reason, in the case of FIG. 8, a situation may occur in which the assistance control starts without the driver's recognition and ends without the driver's recognition.

Figure 9:
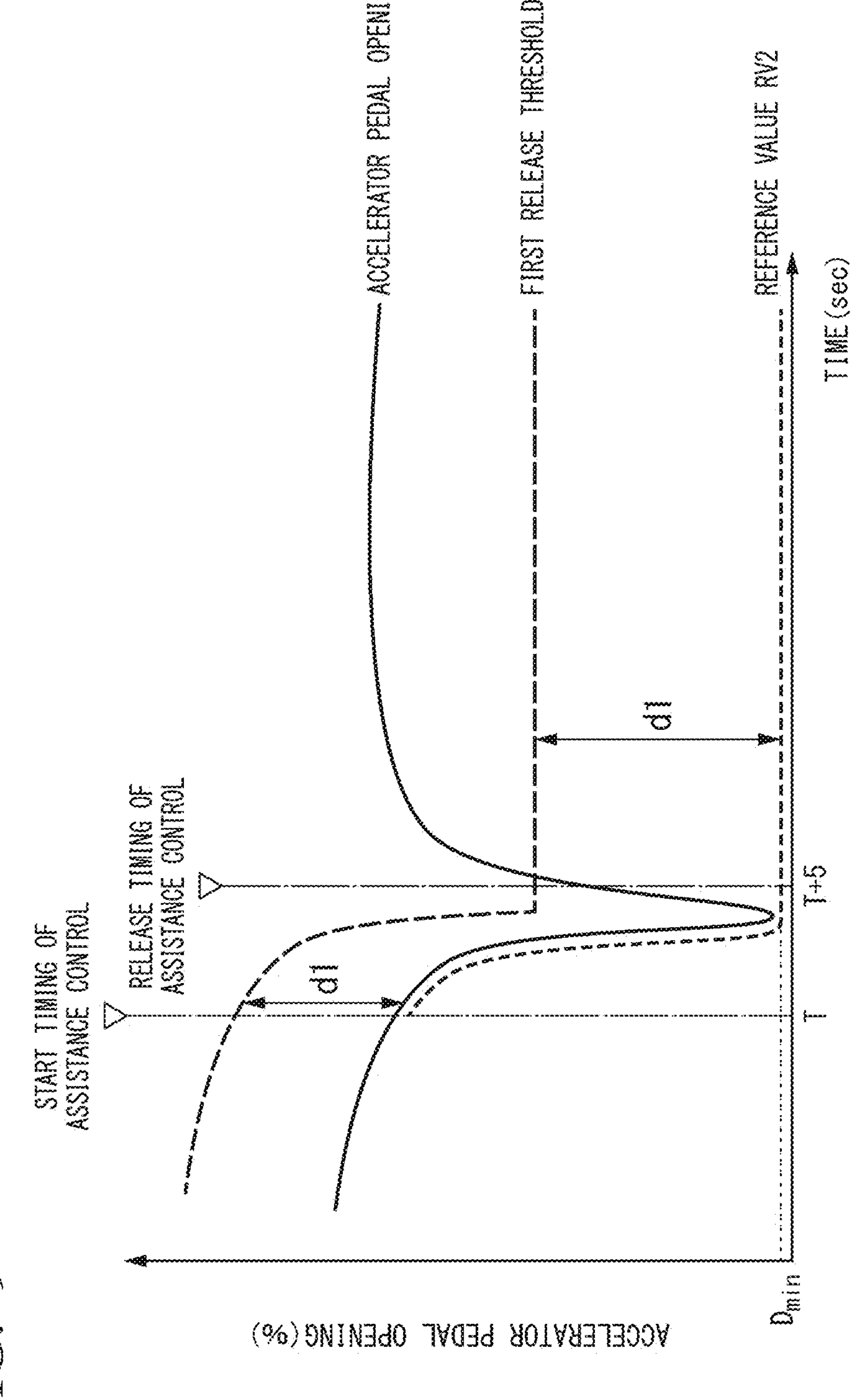
FIG. 9 is a view showing an example of change over time in a release threshold (first release threshold) in the first embodiment.

FIG. 9 is a view showing an example of a time change of a release threshold (first release threshold) in the case of the first embodiment. A lateral axis indicates a time, and a vertical axis indicates an accelerator pedal opening. Here, the release threshold is the threshold for the accelerator pedal opening when determining the release of the assistance control (establishment of the accelerator override) in the case in which the accelerator pedal opening value at the start of assistance control is large and the margin to the maximum operation amount of the accelerator pedal operation is less than the predetermined value. More specifically, in the case of the first embodiment, the release threshold is a value obtained by adding the predetermined value, which is used to determine the success or failure of the accelerator override, to the reference value RV2. That is, in the first embodiment, it is determined that the accelerator override is established when the accelerator pedal opening exceeds the release threshold. Hereinafter, in order to distinguish between the release threshold in the first embodiment and the release threshold in the second embodiment, the former will be referred to as the "first release threshold" and the latter as the "second release threshold."

However, as in the example of FIG. 9, in a situation where the accelerator pedal opening value is large and the margin to the maximum operation amount of the accelerator pedal is less than the predetermined value, the assistance control is started, and when the driver releases the accelerator pedal at the same time as the assistance control starts (the time T) and then immediately presses the accelerator pedal again, the accelerator override is established immediately after the assistance control starts, and the assistance control is released immediately after it starts. This is because the accelerator pedal was released at the same time as the assistance control started, and the reference value RV2 was changed to a minimum value $D_{min}$ of the accelerator pedal opening within a short time from the start of the assistance control. In this case, after the reference value RV2 is set to the minimum value $D_{min}$, the accelerator override is established and the assistance control is released at time T+5, the timing when the accelerator pedal opening has increased by a predetermined value d1 or more from the reference value RV2 (the minimum value $D_{min}$) (i.e., when the accelerator pedal opening exceeds the first release threshold).

In a situation where such accelerator override is likely to occur, the driver may mistakenly believe that the deceleration that began at the time T was due to his/her own acceleration operation (releasing the accelerator pedal), and may not realize that the assistance control was already in place. For example, when the driver can recognize the first alarm, the driver can recognize that the deceleration that started at the time T was performed by the assistance control. However, when the driver is unable to recognize the first alarm, especially when the first alarm is notified only by an image and the driver misses the display of the first alarm, it will be difficult for the driver to recognize that assistance control has been started, and the driver will likely mistakenly believe that the deceleration that started from time T was due to his/her own acceleration operation (releasing the accelerator pedal) rather than recognizing that it was due to the assistance control.

From the viewpoint of safe driving, it is undesirable for the vehicle to behave in a way that the driver does not intend, or for the driver to have a false understanding of the vehicle's behavior. Here, in the second embodiment, a control method of suppressing occurrence of the accelerator override not intended by the driver will be described by expanding the first embodiment.

Figure 10:
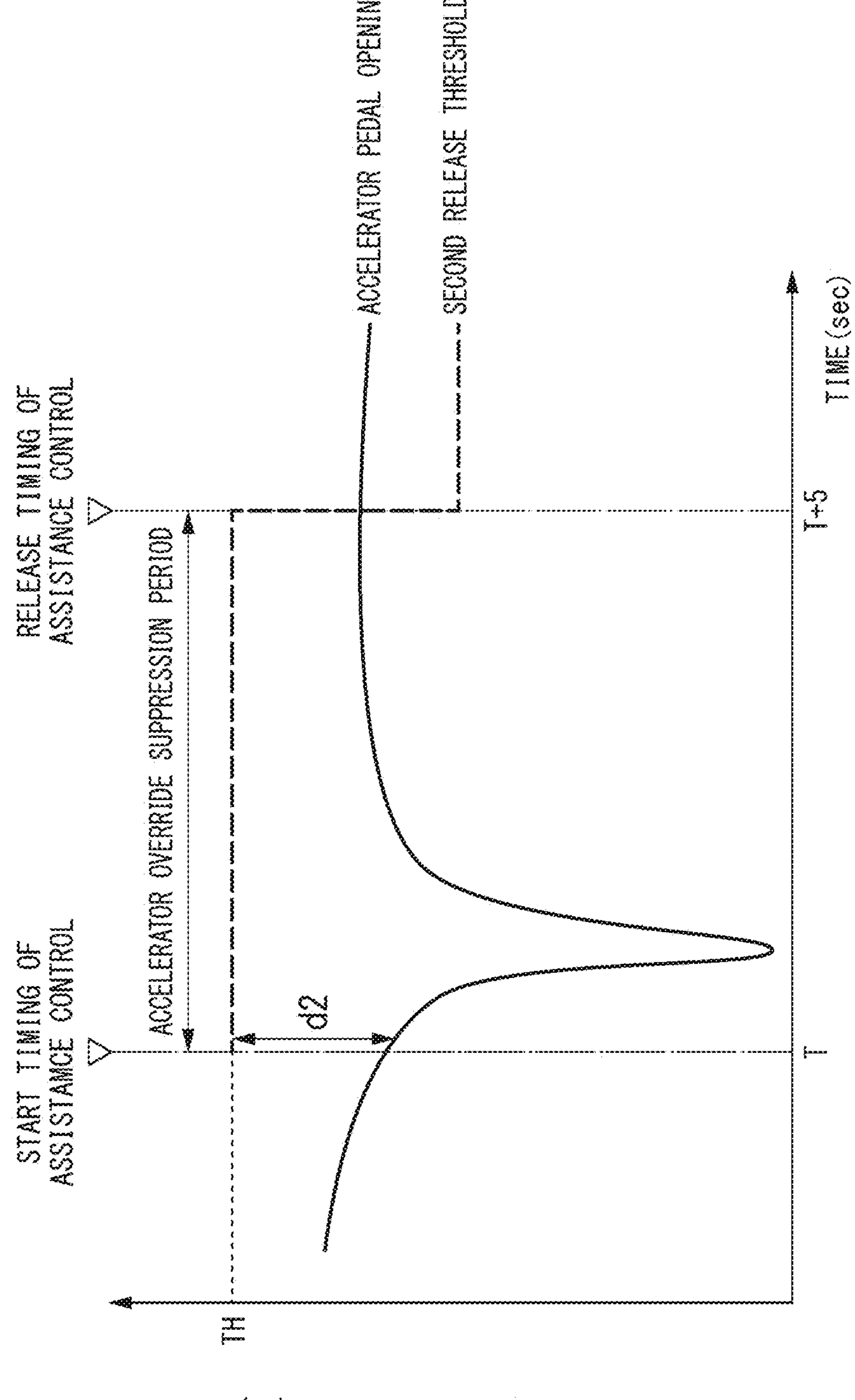
FIG. 10 is a view showing an example of time change of a release threshold (second release threshold) in a second embodiment.

FIG. 10 is a view showing an example of a time change of a release threshold (second release threshold) in the second embodiment. In the case of the first embodiment (see FIG. 9), by setting the reference value RV2 as the minimum value of the accelerator pedal opening after the start of the assistance control, and setting d, which determines the first release threshold for the reference value RV2, as the predetermined value, the first release threshold after the accelerator pedal opening reached the minimum value $D_{min}$ became constant at $D_{min}$+d1, creating a situation in which the accelerator override was likely to occur. On the other hand, in the second embodiment, as shown in FIG. 10, the second release threshold is set to a value higher than the first release threshold during the period from when the assistance control has begun until the predetermined time has elapsed, thereby suppressing the establishment of the accelerator override. The predetermined time herein may be set arbitrarily from the viewpoint of driving safety or convenience of the assistance control. For example, the predetermined time may be the time from when the assistance control has begun until the second deceleration begins. Hereinafter, the period from when the assistance control has begun until the above-mentioned predetermined time has elapsed is referred to as the "accelerator override suppression period."

In addition, the value of the second release threshold, which is higher than the first release threshold, is a value that is high enough to suppress the occurrence of the accelerator override compared to the first embodiment. The second release threshold in the accelerator override suppression period may be a constant value or may be a value determined according to the reference value RV2. FIG. 10 is an example in which a second release threshold in the accelerator override suppression period is fixed to a value TH greater than the value of the first release threshold at the start timing of the assistance control. A second release threshold TH may be a predetermined value that is determined in advance, or may be determined on the basis of the accelerator pedal opening at the start timing of the assistance control. For example, the second release threshold TH may be obtained by adding a predetermined value d2 to the accelerator pedal opening at the start timing of the assistance control. The predetermined value d2 may be the predetermined value d1 that determines the first release threshold.

Figure 11:
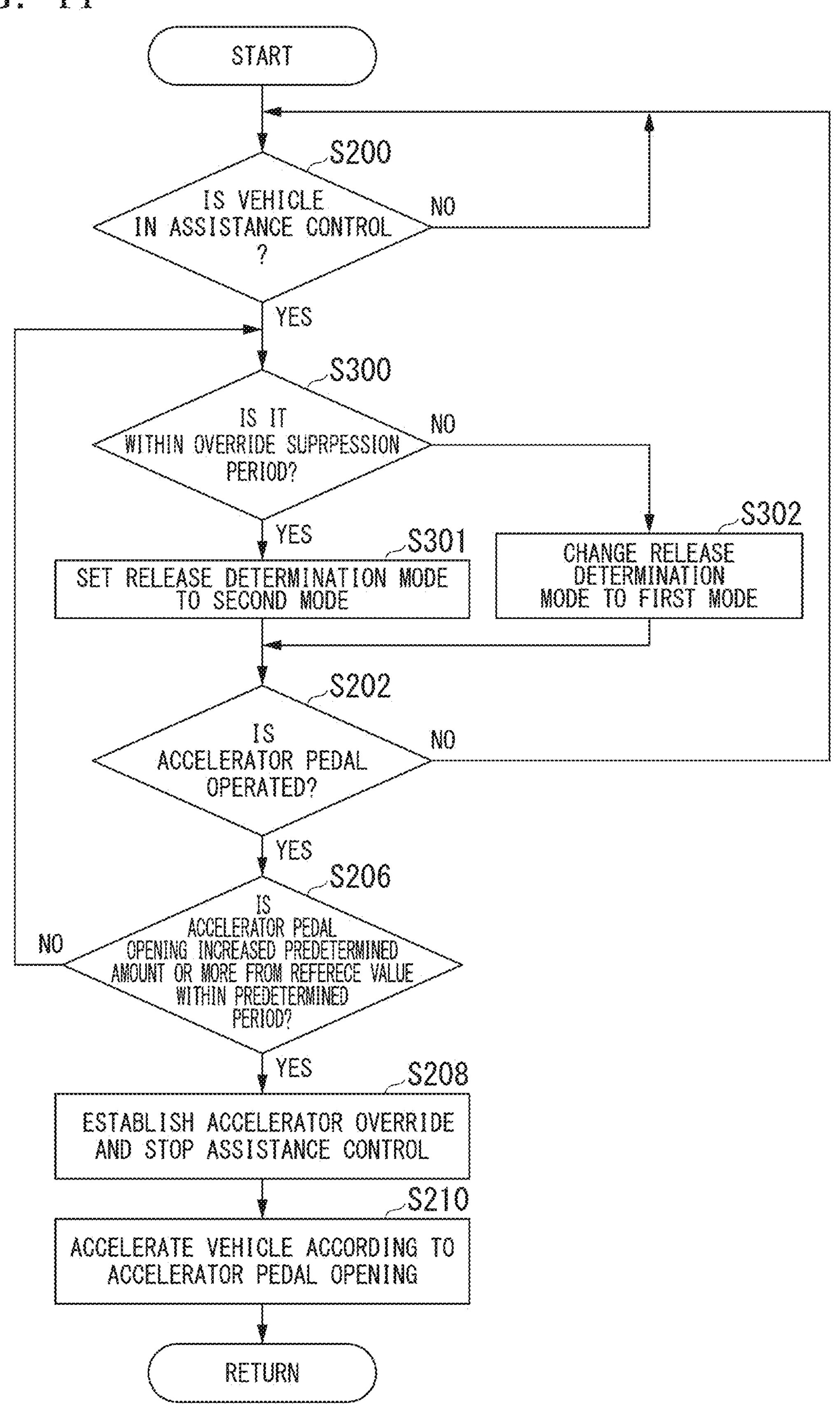
FIG. 11 is a flowchart showing an example of processing of accelerator override executed by a driver assistance device in the second embodiment during an accelerator override deterrence period.

FIG. 11 is a flowchart showing an example of processing of the accelerator override executed by the driver assistance device 100 in the second embodiment during the accelerator override deterrence period. In FIG. 11, the same processing as in FIG. 7 is denoted by the same reference numerals as in FIG. 7 and the description thereof will be omitted. First, when the driver assistance device 100 determines in step S200 that it is in the assistance control, it determines whether it is currently the override suppression period (S300). When it is determined that the current time is within the override suppression period, the driver assistance device 100 sets the release determination mode to a second mode (S301), and proceeds to processing in S202.

Here, the release determination mode is a processing operation mode that determines whether the assistance control is released when the driver performs an operation that significantly increases the opening angle of the operator in a short time (corresponding to the reference value RV2). The second mode is a mode in which the accelerator pedal opening is compared with the second release threshold to determine whether the accelerator override has been achieved, and the first mode is a mode in which the accelerator pedal opening is compared with the first release threshold to determine whether the accelerator override has been achieved. Meanwhile, in S300, when it is determined that the current period is not within the override suppression period, the driver assistance device 100 changes the release determination mode to the first mode (S302) and advances the processing to S202.

According to the above-mentioned second embodiment, like the first embodiment, regardless of whether the driver performs an operation that significantly increases the opening angle of the operator in a short time (corresponding to the reference value RV2) or an operation that gradually increases the opening angle over time (corresponding to the reference value RV1), while still allowing the driver to override the assistance control through the acceleration operation, even if the accelerator pedal is released at the same time as the assistance control begins and then an operation is performed in which the accelerator pedal is pressed again immediately thereafter, the occurrence of the accelerator override can be suppressed during the override suppression period.

According to the above-mentioned embodiment, when the driver performs the acceleration operation while the assistance control is being performed, the assistance controller 150 determines whether the operation amount of the acceleration operation has increased by more than a predetermined value within a predetermined period, and stops the assistance control when the operation amount of the acceleration operation has increased by more than the predetermined value. Accordingly, it is possible to realize the vehicle control according to the driver's intention.

The above-mentioned embodiment can be expressed as follows.

A vehicle control device including:

a storage device on which a program is stored; and a hardware processor, the hardware processor executing the program stored on the storage device to:

acquire first information related to a curved road existing a direction of advance of a vehicle;

acquire second information including an acceleration operation amount of a driver of the vehicle; and perform notification control to notify the driver to adjust a speed of the vehicle to be equal to or lower than a target speed, which is based on the first information refer the second information during execution of the notification control and stop the notification control when the acceleration operation amount has increased a predetermined value or more from a reference value, when the vehicle is traveling on a section which is from a predetermined distance before an entrance of the curved road until the entrance of the curved road or traveling on the curved road, wherein the reference value is set according to the acceleration operation amount when the notification control was started until a predetermined time elapses from the start of the notification control.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle control device comprising:

a first acquisition part configured to acquire first information related to a curved road existing in a direction of advance of a vehicle;

a second acquisition part configured to acquire second information including an acceleration operation amount of a driver of the vehicle; and a controller configured to perform notification control to notify the driver to adjust a speed of the vehicle to be equal to or lower than a target speed, which is based on the first information, and configured to refer the second information during execution of the notification control and to stop the notification control when the acceleration operation amount has increased a predetermined value or more from a reference value, when the vehicle is traveling on a section which is from a predetermined distance before an entrance of the curved road until the entrance of the curved road or traveling on the curved road, wherein the reference value is set according to the acceleration operation amount when the notification control was started until a predetermined time elapses from the start of the notification control.

2. The vehicle control device according to claim 1, wherein the controller is configured to change the notification control to second notification by sound from first notification by display, and the predetermined time is a time period until the notification control is changed to the second notification from the first notification.

3. The vehicle control device according to claim 1, wherein the controller is configured to set the reference value to a minimum value of the acceleration operation amount during execution of the notification control, after the predetermined time has elapsed.

4. The vehicle control device according to claim 1, wherein the controller is configured to perform deceleration control to decelerate the vehicle so that the speed of the vehicle approaches a target speed based on the first information, when the vehicle is traveling on the section which is from the predetermined distance before the entrance of the curved road until the entrance of the curved road or traveling on the curved road.

5. A vehicle control method of causing a computer to:

acquire first information related to a curved road existing in a direction of advance of a vehicle;

acquire second information including an acceleration operation amount of a driver of the vehicle; and perform notification control to notify the driver to adjust a speed of the vehicle to be equal to or lower than a target speed, which is based on the first information, refer the second information during execution of the notification control and stop the notification control when the acceleration operation amount has increased a predetermined value or more from a reference value, when the vehicle is traveling on a section which is from a predetermined distance before an entrance of the curved road until the entrance of the curved road or traveling on the curved road, wherein the reference value is set according to the acceleration operation amount when the notification control was started until a predetermined time elapses from the start of the notification control.

6. A computer-readable non-transitory storage medium in which a program is stored to cause a computer to:

acquire first information related to a curved road existing in a direction of advance of a vehicle;

acquire second information including an acceleration operation amount of a driver of the vehicle;

perform notification control to notify the driver to adjust a speed of the vehicle to be equal to or lower than a target speed, which is based on the first information; and refer the second information during execution of the notification control and stop the notification control when the acceleration operation amount has increased a predetermined value or more from a reference value, when the vehicle is traveling on a section which is from a predetermined distance before an entrance of the curved road until the entrance of the curved road or traveling on the curved road, wherein the reference value is set according to the acceleration operation amount when the notification control was started until a predetermined time elapses from the start of the notification control.

* * * * *